United States Patent Office 3,248,338
Patented Apr. 26, 1966

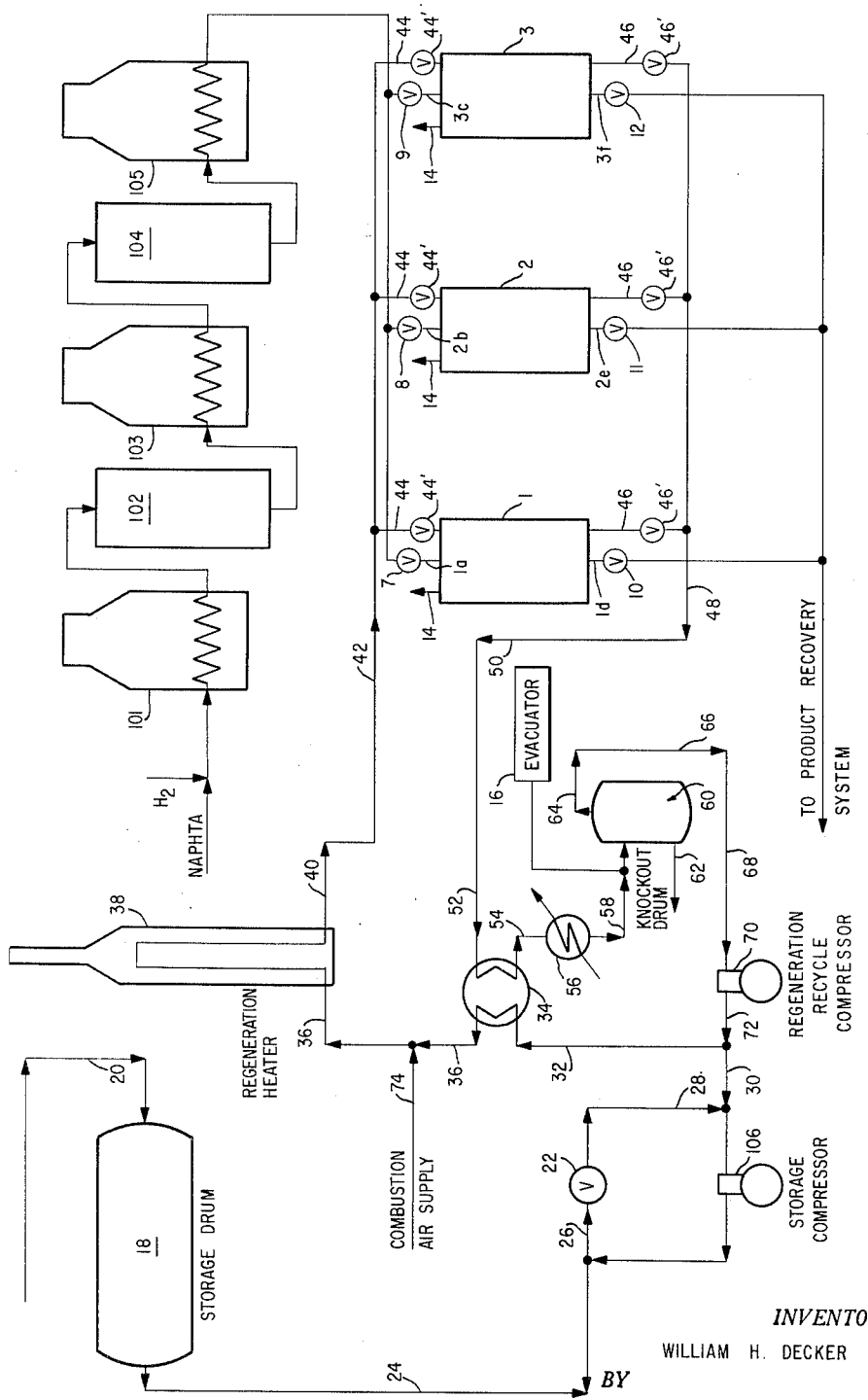

3,248,338
PROCESS OF REGENERATING A CATALYST
William H. Decker, Chicago, Ill., assignor to Sinclair Research, Inc., Wilmington, Del., a corporation of Delaware
Filed Aug. 30, 1961, Ser. No. 135,058
4 Claims. (Cl. 252—416)

This invention relates to hydrocarbon reforming. More particularly, the present invention is directed towards a method of regenerating high severity catalytic reforming systems.

Petroleum refiners have attempted more or less unsuccessfully to develop catalysts having long life or aging stability in order to successfully operate high severity reforming processes without the necessity of frequent regeneration. Since known regeneration systems have been intrinsically expensive in terms of materials and manufacture, there has resulted the need for the development of a regeneration system which meets the requirements of low cost and simplicity in operation.

Also a regeneration system that eliminates or reduces the danger of carbon monoxide poisoning of reforming catalysts, particularly the platinum-metal-containing catalysts commonly used in reforming, is highly desirable, for such poisoning results in rapid deactivation and subsequent loss in the performance of these catalysts. Conventional regeneration systems normally utilize either gas- or oil-fired generators to produce the inert combustion gas that is circulated through the reactor beds during the regeneration operation. While operating conditions of these units are adjusted to minimize the amount of carbon monoxide present in the inert gas, experience has indicated that even with the most exacting controls, significant amounts of carbon monoxide are present and damage the catalyst. These generators, furthermore, produce an inert gas which is unfortunately saturated with water at high temperatures. This gas must, therefore, be cooled and dried in order to reduce the water content to an acceptable level, inasmuch as water has a deleterious effect on catalyst supports, such as alumina. Accordingly, it is the purpose of this invention to produce a regeneration method which alleviates these problems and provides a process which is economical and has simplicity of design.

The regeneration method of the present invention can be used with a catalytic reforming system employing multiple fixed bed catalytic reactors. Although the method of the present invention can be applied to low severity reforming systems it finds particular applicability to the high severity multiple fixed bed catalytic systems wherein petroleum naphtha is contacted with the catalyst material under high temperatures, usually ranging from about 850 to 1050° F., and pressures of about 100 to 500 p.s.i.g., to produce reformates having octane numbers of 95 or better neat by the Research Octane Method.

In accordance with the present invention a reactor having a deactivated catalyst bed is isolated from the system and positioned in a circulatory regeneration system whose path includes a heater, the isolated reactor, a flash drum and a gas compressor. The reactor in question is evacuated of hydrocarbons and hydrogen and an inert gas from a storage drum is introduced into the regeneration system and circulated to further denude the reactor of hydrocarbons and hydrogen. The inert gas mixture is then evacuated from the regeneration system and heated inert gas is again circulated through the system until the cooled catalyst in the reactor is at a temperature in excess of about 550° F. Liquid hydrocarbons are condensed from the circulating gases by action of the flash drum. Oxygen-containing gas is then introduced and circulated to burn-off carbon deposits on the catalyst in the reactor. During the initial stages of this combustion period inert gas from the flash drum is returned to the storage drum. The oxygen-containing gas is then evacuated from the system and the reactor containing regenerated catalyst is returned to the conversion system.

The invention may be more clearly understood by reference to the accompanying drawing which is a schematic diagram of the regeneration method of the present invention.

Straight-run naphtha and molecular hydrogen are charged to preheater 101 and then passed successively to reactor 102, heater 103, reactor 104 and heater 105. These reactors and heaters are thus connected for series flow. As a specific example, the inlet temperatures to the separate reactors, including subsequent reactors 1, 2, 3 when in use are equal, e.g., about 925° F. and the reforming pressure is 200 p.s.i.g., at an overall space velocity of 2 WHSV and an initial hydrogen to hydrocarbon mol ratio of about 7 to 1.

Reactors 1, 2 and 3 represent the parallel-piped terminal reactors of the reforming system having hydrocarbon-hydrogen inlet lines $1a$, $2b$, and $3c$, respectively, and hydrocarbon-hydrogen outlet lines $1d$, $2e$ and $3f$, respectively, connected to the product recovery system (not shown). The inlet and outlet lines of these reforming reactors are shown as distinct from the regeneration system inlet and outlet lines to the reactors. The reforming system inlet lines are provided with valves 7, 8 and 9 and the reforming system outlet lines with valves 10, 11 and 12.

In the regeneration method of the present invention, when it is desired to regenerate the catalyst of one of the terminal reactors, for example reactor 1, the reactor is isolated from the reforming system by closing valves 7 and 10 in the inlet and outlet lines $1a$ and $1d$ of the reforming system; having at least one pair of valves 8 and 11 or 9 and 12 open for continuation of the reforming operation. The isolated reactor is then depressurized by opening vent 14 and releasing the hydrocarbon and hydrogen gases in the reactor. The opening of valves 44' and 46' places reactor 1 in the regeneration system of the present invention, and the corresponding valves of reactors 2 and 3 remain closed to avoid interfering with the regeneration. The evacuator 16 is then turned on and the entire regeneration system except for the storage drum 18 is evacuated for a time sufficient to provide maximum removal of hydrogen and hydrocarbons from the reactor bed.

The evacuator 16 is then turned off and the regeneration system is pressurized to about 5 to 20 p.s.i.g., preferably about 5 to 10 p.s.i.g. with an inert gas, e.g., a gas containing 90 or more volume percent nitrogen. The inert gas which enters the system through line 20 is stored in drum 18. When the storage control valve 22 is open, the inert gas flows from the storage tank through lines 24, 26 and through control valve 22. The inert gas then passes through lines 28, 30 and 32 and into one side of indirect heat exchanger 34 and then through line 36 into regeneration heater 38. The heater can be by-passed in this portion of the operation if desired. The inert gas then passes through lines 40 and 42 into reactor 1 by line 44. The inert gas which now contains hydrocarbon materials from the reactor passes out of the reactor 1 via line 46 and through lines 48, 50 and 52 into the second side of heat exchanger 34. The gas then passes from the heat exchanger through line 54 into cooler 56. The cooled inert gas, e.g., 80–100° F., and hydrocarbon material pass through line 58 into a flash or knockout drum 60 where liquid hydrocarbon materials are condensed and removed through line 62. The inert gas then passes through lines 64 and 66 and 68 into the regeneration recycle compressor 70 and then into line 772 thus completing circulation of the inert gas through the regeneration system. With valve 22 closed, the regeneration recycle compressor continues recycling the inert gas through the regeneration system for, for instance, about 10 to 60 minutes, so as to purge residual hydrogen and hydrocarbons from the catalyst. The compressor is then stopped and the system is evacuated, again using evacuator 16.

The regeneration system is again pressurized with inert gas from the storage tank, this time preferably at a higher pressure, e.g., at least about 5 p.s.i.g. higher, than in the initial pressurizing and circulating period. Normally the system will be pressurized the second time to about 20 to 50 p.s.i.g. The regeneration circulation compressor 70 is again placed into service and the inert gas circulated in the cycle previously described. The regeneration heater 38 is fired and the reactor 1 catalyst temperature is raised from a substantially lower temperature to about 550 to 850° F. or more through heat carried in the circulating gases. Molecular oxygen-containing gas, usually of about 0.1 to 5% oxygen, is then admitted to the system through line 74 and passes through the regeneration heater 38 and lines 40, 42 and 44 into reactor 1 wherein the fixed bed of catalyst material such as platinum-alumina catalyst is regenerated. As an example, the oxygen concentration of the recirculating gas can be maintained between 0.5 and 0.7 volume percent. During circulation of the oxygen-containing gas, the pressure of the system fay be allowed to build up, for instance, to about 50 to 150 p.s.i.g. The storage compressor 106 is placed into service during initial or subsequent stages of regeneration so as to build up the desired gas pressure in the storage drum 18 through introduction of non-oxygen containing inert combustion gas from line 30. When the storage drum reaches the desired storage pressure in the range of about 200–400 p.s.i.g. the storage compressor is shut off. Any excess gas formed during the regeneration of the catalyst increasing the pressure over about 50—100 p.s.i.g. can be released to the atmosphere.

When the catalyst in reactor 1 has been regenerated, that is, when the carbonaceous deposits on the catalyst have been burned off to afford the desired catalytic characteristics of activity and selectivity, the oxygen-containing gas circulation is stopped and the heater 38 shut down. The pressure of the system is then reduced and the system evacuated of oxygen-containing gas by means of evacuator 16. Reactor 1 may then be pressured to operating or hydrocarbon conversion pressure with hydrogen-containing recycle gas from the reforming system and returned to normal service in the reforming operation by closing valves 44' and 46' and opening valves 7 and 10. This pressuring step insures that the system is not subject to pressure fluctuations when the reactor is returned to service.

It is preferred, prior to pressurizing the reactor with recycle gas from the reforming system, to pressurize the system to about 5 to 20 p.s.i.g. with inert gas, circulate the inert gas through the system and then evacuate the system of the inert gas as previously described. This procedure further denudes the catalyst and reactor of oxygen and carbonaceous or other hydrocarbon deposits. This procedure may be repeated a number of times if desired but there is little apparent significance in repeating the procedure more than about five times. The catalyst of reactors 2 and 3 can also be regenerated by the above described procedures.

The process of this invention thus provides a method whereby it is only necessary to fill the storage drum with inert gas at the start of initial operations. The subsequent inert gas requirements are provided by the inventory in the storage drum. Repressuring of the storage drum is closely regulated so that there is no residual oxygen present in the system at the time of filling. This is normally during the early stages of regeneration when the regeneration off-gases contain no free oxygen and thus there is very little opportunity for oxygen to pass from the reactor into the storage zone. The size and normal operating pressure of the storage drum is fixed by the internal volume of the regeneration system and the reactor. The capacity of the storage compressor is also fixed by associate equipment sizing and the rate at which it is desired to repressure the storage drum. For the majority of considered designs this storage drum is relatively small and requires only an operating pressure of about 200 to 400 p.s.i.g.

The amount of oxygen-containing gas utilized in the regeneration system is dependent upon a number of conditions such as the particular contaminated catalyst of the reactor regenerated, the length of the circulation periods, the temperature and pressure and the like. Generally, the oxygen-containing gas is circulated for a period of from 15 minutes to 2 hours.

The process of this invention is particularly useful in regenerating platinum-metal-alumina or platinum-type metal catalysts containing about .01 to 2 weight percent of platinum or other platinum group metal, preferably .1 to .75 weight percent. An example of such catalysts are those shown in U.S. Patents 2,838,444 and 2,838,445. In any event, however, the regeneration process may be advantageously employed in most catalytic hydrocarbon conversion processes in order to reactivate the catalyst material. Typical reforming conditions include temperatures of about 800 to 1050° F., pressures of about 100 to 700 p.s.i.g., space velocities of about 1 to 20 WHVS and hydrogen to hydrocarbon mole ratio of about 1 to 20:1. This regeneration system is particularly successful when utilized with short recycle, high severity reforming operations.

It will be apparent to one skilled in the art that there are a number of variations to the above arrangement which for certain applications might be desirable. For example, the above systems have been described when used with multiple terminal reactors of a high severity operating unit. However, by proper selection of the size of the storage drum this system would be applicable for most reactors of typical reforming units. It would also be feasible, for example, to install small caustic scrubbers for removal of carbon dioxide, if required, from the inert gas mixture as it is compressed to the storage drums. Another variation would be to provide small fixed bed driers for complete water removal from the inert stream passed to the storage drum. Any number of automatic controls depending upon the particular embodiment, specific type of reforming, and the size and nature of the regeneration system may be utilized.

It is claimed:

1. A method of regenerating a fixed deactivated catalyst bed in a hydrocarbon conversion system employing multiple reactors containing catalyst and molecular hydrogen which comprises isolating the reactor whose catalyst is to be regenerated from the conversion system and positioning the reactor in a circulatory regeneration system whose path includes a heater, said reactor, a flash drum and a gas compressor, introducing an inert gas from a storage drum to said regeneration system and circulating the gas through the regeneration system to denude the reactor of hydrocarbons and hydrogen, removing condensed liquid hydrocarbon from said inert gas during circulation, evacuating the inert gas mixture from the regeneration system, circulating heated inert gas through said regeneration system until the catalyst in said reactor is at a temperature in excess of about 550° F., introducing a molecular oxygen-containing gas to said regeneration system, circulating said oxygen containing gas through said system to burn off carbon deposits on the catalyst in said reactor, returning inert gas from said flash drum to said storage drum during a combustion period when the regeneration off-gas is non-free oxygen containing, evacuating the regeneration system of said oxygen-containing gas, and returning the reactor containing regenerated catalyst to the conversion system.

2. The method of claim 1 wherein the catalyst is a platinum group metal-alumina catalyst.

3. The method of claim 2 wherein the catalyst is a platinum-alumina naphtha reforming catalyst.

4. The method of claim 3 wherein the first inert gas introduction is at a pressure of about 5 to 20 p.s.i.g. and the second inert gas introduction is at a pressure of about 20 to 50 p.s.i.g. and at least about 5 p.s.i.g. higher than the first inert gas introduction.

References Cited by the Examiner
UNITED STATES PATENTS

| | | | |
|---|---|---|---|
| 2,259,485 | 10/1941 | Plummer | 252—416 |
| 2,870,085 | 1/1959 | Love | 252—416 |
| 3,005,781 | 10/1961 | Riordan | 252—416 |
| 3,013,980 | 12/1961 | Carr et al. | 252—416 |

MAURICE A. BRINDISI, *Primary Examiner.*